United States Patent
Nomura et al.

(10) Patent No.: US 8,243,736 B2
(45) Date of Patent: Aug. 14, 2012

(54) PACKET CAPTURING DEVICE

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 12/603,803

(22) Filed: Oct. 22, 2009

(65) Prior Publication Data

US 2010/0103946 A1    Apr. 29, 2010

(30) Foreign Application Priority Data

Oct. 28, 2008   (JP) .................. 2008-277472

(51) Int. Cl.
*H04L 12/56* (2006.01)
(52) U.S. Cl. ........................................... 370/394
(58) Field of Classification Search .............. 370/241, 370/242, 243, 246, 248, 252–253, 351, 389, 370/392, 394, 412, 428–429
See application file for complete search history.

(56) References Cited

U.S. PATENT DOCUMENTS

| 2007/0070916 A1 * | 3/2007 | Lehane et al. | 370/252 |
| 2009/0086736 A1 * | 4/2009 | Foong et al. | 370/394 |
| 2010/0098033 A1 * | 4/2010 | Lee et al. | 370/338 |

FOREIGN PATENT DOCUMENTS

| JP | 2005-39572  | 2/2005 |
| JP | 2005-210515 | 8/2005 |

* cited by examiner

*Primary Examiner* — Anh-Vu H Ly
*Assistant Examiner* — Omar Ghowrwal
(74) *Attorney, Agent, or Firm* — Katten Muchin Rosenman LLP

(57) ABSTRACT

A next sequence number, which is a sequence number that a next packet should have, is compared with the sequence number of a current packet, an identifier of a previous packet is compared with the identifier of the current packet, and a delay is judged to be a simple delay when the next sequence number matches the sequence number of the current packet and the identifier of the previous packet is followed by the identifier of the current packet. Or the delay is judged to be caused by a retransmission when the identifier of the previous packet is not followed by the identifier of the current packet.

4 Claims, 15 Drawing Sheets

FIG. 3

| SENDER ADDRESS | TCP SESSION ID | PREVIOUS RECEPTION TIME | NEXT SEQ | PREVIOUS ID VALUE |
|---|---|---|---|---|
| α | A | 2008/2/19 14:10:05.491392 | 680 | 335 |
| α | B | 2008/2/19 14:10:05.115728 | 421 | 211 |
| α | C | 2008/2/19 14:10:05.325289 | 102 | 100 |
| ... | ... | ... | ... | ... |

FIG. 4

| SENDER ADDRESS | TCP SESSION ID | NUMBER OF PACKETS TRANSMITTED | LOSS COUNT | LOSS RATE | TOTAL DELAY TIME (msec) |
|---|---|---|---|---|---|
| α | A | 30 | 0 | 0% | 120 |
| α | B | 410 | 5 | 1.2% | 100 |
| α | C | 25 | 0 | 0% | 3300 |
| ... | ... | ... | ... | ... | ... |

FIG. 8

| SENDER ADDRESS | TCP SESSION ID | NUMBER OF PACKETS TRANSMITTED | NUMBER OF TIMES JUDGMENT PROVED IMPOSSIBLE | TOTAL DELAY TIME (msec) |
|---|---|---|---|---|
| α | A | 30 | 1 | 120 |
| α | B | 410 | 4 | 100 |
| α | C | 25 | 0 | 3300 |
| ... | ... | ... | ... | ... |

FIG. 9

| SENDER ADDRESS | CONTINUATION STARTING ID VALUE | IMMEDIATELY PRECEDING ID VALUE | INCREMENT = N |
|---|---|---|---|
| α | 1 | 335 | 1 |
| β | 1100 | 1200 | 3 |
| ... | ... | ... | ... |

FIG. 13

| SENDER ADDRESS | TCP SESSION ID | NUMBER OF PACKETS TRANSMITTED | LOSS COUNT | LOSS RATE | TOTAL DELAY TIME (msec) | NUMBER OF TIMES JUDGMENT PROVED IMPOSSIBLE |
|---|---|---|---|---|---|---|
| α | A | 30 | 0 | 0% | 120 | 1 |
| α | B | 410 | 5 | 1.2% | 100 | 4 |
| α | C | 25 | 0 | 0% | 3300 | 0 |
| ... | ... | ... | ... | ... | ... | ... |

FIG. 14

| SENDER ADDRESS | OS TYPE |
|---|---|
| α | B |
| β | A |
| γ | A |
| ... | ... |

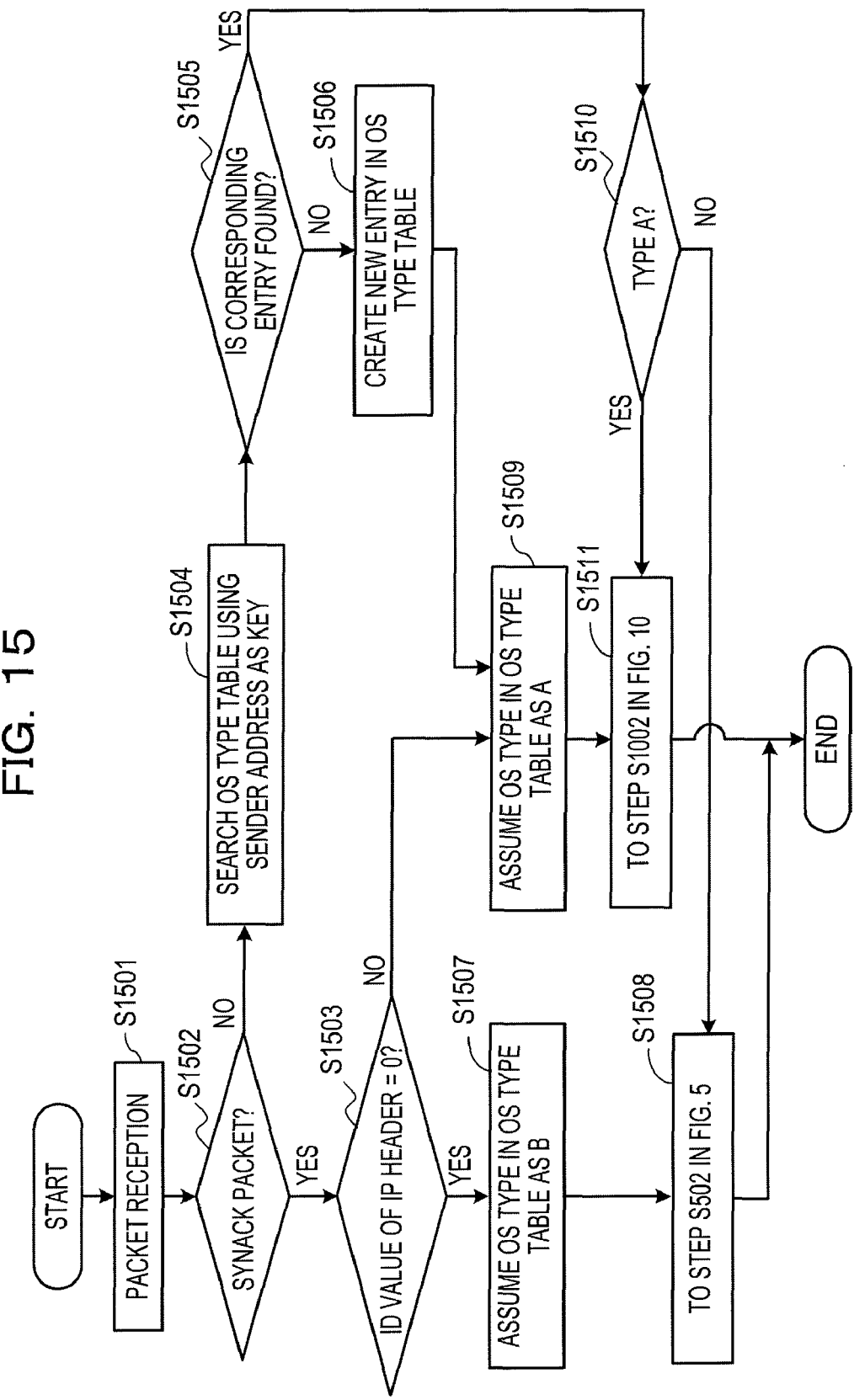

PACKET CAPTURING DEVICE

CROSS-REFERENCE TO RELATED APPLICATIONS

This application is based upon and claims the benefit of priority of the prior Japanese Patent Application No. 2008-277472, filed on Oct. 28, 2008, the entire contents of which are incorporated herein by reference.

FIELD

The present invention relates to a packet capturing device that judges the cause of packet delay.

BACKGROUND

In operation and maintenance of a system, if a packet delay occurs, the cause thereof needs to be correctly understood to solve such a problem. In order to solve the problem, it is necessary to specifically know whether the packet delay is attributable to a delay in transmitting the packet by the sender of the packet or loss of the packet in a network followed by a retransmission of the packet by the sender and consequently a delayed arrival of the packet.

Regarding a protocol such as TCP (Transmission Control Protocol) that has a retransmission procedure among protocols in layers higher than IP (Internet Protocol), packet loss is conventionally identified using sequence numbers that monotonically increase as a clue, judging that no packet loss has occurred if the sequence numbers are consecutive numbers.

Therefore, when the sequence numbers are consecutive numbers, the packet is not recognized as having been lost, and in any case where a packet arrival is delayed from a previously received packet, it is judged that the transmitting host simply took time to transmit the packet.

Japanese Patent Application No. 2005-210515 describes a technique of identifying a retransmission or normal transmission from time-series information on packet arrivals based on sequence numbers.

However, protocols such as TCP that have a retransmission procedure, in layers higher than an IP layer, generally retransmit, after a packet loss occurs, the packet to recover from the loss. Even if a packet is lost between a transmitting host and a measuring device and the transmitting host retransmits the packet, since the measuring device can observe that the sequence numbers are consecutive numbers, there is a problem that the measuring device fails to identify the packet loss as a loss but judges it as a simple delay.

As such, the conventional method judges a loss or delay from the continuity of sequence numbers on TCP headers, and cannot thereby correctly judge the cause of delay. An object of the disclosed technique is to provide a device capable of correctly identifying whether a packet delay is attributable to a simple delay or a delay caused by a retransmission.

SUMMARY

A packet capturing device has an acquisition unit that acquires an ID value and a sequence number written on a header of a received packet. The device has a storage unit that stores a previous ID value which is an ID value of a previously received packet and a next sequence number which is a sequence number that a next packet to be received should have. The device has a detection unit that judges whether a delay of the received packet is caused by a simple delay or a retransmission accompanying a loss. The detection unit compares the next sequence number with a sequence number of the packet acquired this time. The detection unit compares the previous ID value with an ID value of the packet received this time. The detection unit judges that the delay is a simple delay when the next sequence number matches the sequence number of the packet received this time and the previous ID value is followed by the ID value of the packet received this time or judges that the delay is caused by a retransmission when the previous ID value is not followed by the ID value of the packet received this time.

Additional aspects and/or advantages will be set forth in part in the description which follows and, in part, will be apparent from the description, or may be learned by practice of the invention.

BRIEF DESCRIPTION OF DRAWINGS

FIG. 3 is an example of a communication state table;

FIG. 4 is an example of a monitoring result table;

FIG. 8 is an example of a monitoring result table;

FIG. 9 is an example of a continuation starting ID table;

FIG. 13 is an example of a monitoring result table;

FIG. 14 is an example of an OS type table; and

FIG. 15 is a flowchart of an identification method according to the third embodiment of the present invention.

DESCRIPTION OF EMBODIMENTS (First Embodiment)

Figure 1:
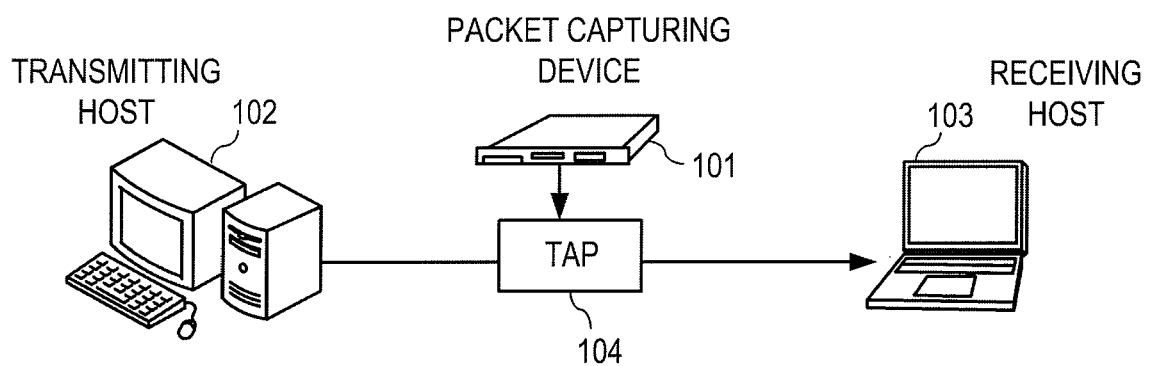
FIG. 1 is a block diagram of a system according to a first embodiment of the present invention.

FIG. 1 is a block diagram of a system according to a first embodiment.

The system according to the first embodiment is provided with a packet capturing device 101, a transmitting host 102, a receiving host 103 and a tap 104.

The tap 104 is interposed between the transmitting host 102 and the receiving host 103.

The packet capturing device 101 is connected to the tap 104, and the transmitting host 102 and the receiving host 103 are connected to the tap 104 via a network respectively.

When the transmitting host 102 transmits a packet to the receiving host 103, the tap 104 interposed between the transmitting host 102 and the receiving host 103 branches the packet to the packet capturing device 101. The packet capturing device 101 then receives the packet.

Figure 2:
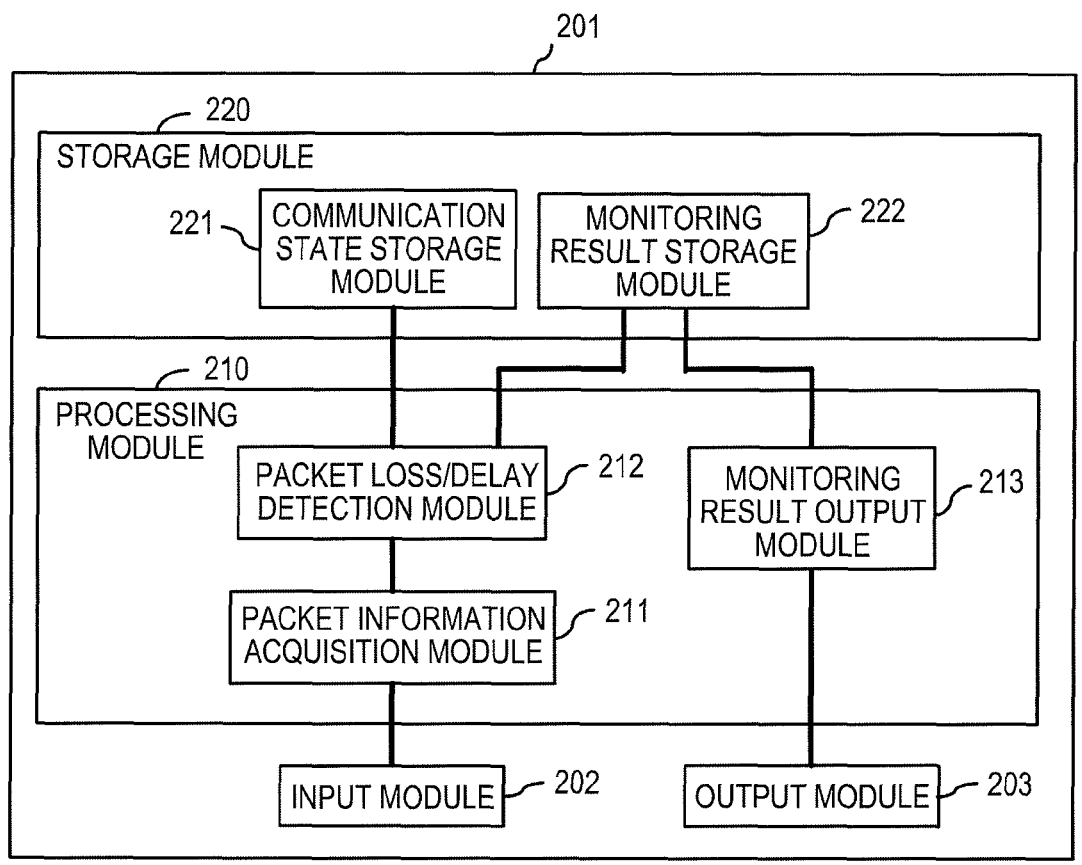
FIG. 2 is a block diagram of a packet capturing device according to the first embodiment of the present invention.

FIG. 2 is a block diagram of the packet capturing device according to the first embodiment.

The packet capturing device 201 is provided with an input module 202, a processing module 210, a storage module 220 and an output module 203.

The input module 202 is an interface through which a packet is inputted. The input module 202 transmits a received packet or information to the processing module 210.

The processing module 210 is provided with a packet information acquisition module 211, a packet loss/delay detection module 212 and a monitoring result output module 213.

The packet information acquisition module 211 creates a TCP session ID from information on an IP header and TCP header. Furthermore, the packet information acquisition module 211 transmits the TCP session ID created, information written on the IP header and TCP header, such as a sequence number and identifier, and time of reception of a packet, or the like, to the packet loss/delay detection module 212. The sequence number is written on the TCP header and is a number used to inform a sequence of data transmitted to a destination (or receiving) host. Using this number, the destination host can correctly rearrange the data or send a request for a retransmission of lost data. The sequence number allows the position of data in the entire data to be recognized.

The identifier is written on the IP header and incremented every time a packet is transmitted.

The packet loss/delay detection module 212 judges, based on information stored in a communication state storage module 221 and information from the packet information acquisition module 211, whether the packet is simply delayed or retransmitted due to a loss. Furthermore, the packet loss/delay detection module 212 writes various types of information, such as a total delay time and loss count of the packet, time of reception and identifier of the packet, into the communication state storage module 221 and a monitoring result storage module 222.

The monitoring result output module 213 acquires part or whole of the information of the monitoring result table stored in the monitoring result storage module 222, and transmits the information to the output module 203. For example, the monitoring result output module 213 may extract stored statistical information based on the value of a specific session ID or a filtering condition of masking with high-order 24 bits of the session ID or the like, and transmit the statistical information to the output module 203.

The storage module 220 is provided with the communication state storage module 221 and the monitoring result storage module 222.

The communication state storage module 221 stores a communication state table as illustrated in FIG. 3.

The communication state table includes items like a sender address, TCP session ID, previous reception time, next SEQ and previous ID value.

The sender address is the IP address of a transmitting host.

The TCP session ID is a value generated from the sender address (SA) of the TCP header of a packet, sender port number (SP), destination address (DA) and destination port (DP).

The previous reception time is the reception time of a previously-received packet.

The next SEQ is a TCP payload size of the previously-received packet added to the sequence number of the previously-received packet and is a packet sequence number which the next packet to be received is expected to have.

The previous ID value is an identifier (ID value) of the IP header of the previously-received packet.

The monitoring result storage module 222 stores a monitoring result table as illustrated in FIG. 4.

The monitoring result table includes items like a sender address, a TCP session ID, the number of packets transmitted, a loss count, a loss rate and a total delay time.

The sender address is the IP address of a transmitting host.

The TCP session ID is a value generated from the sender address (SA) of the TCP header of a packet, sender port number (SP), destination address (DA) and destination port (DP).

The number of packets transmitted is the number of packets transmitted by the sender (or transmitting) host and received by the packet capturing device.

The loss count is the number of lost packets.

The loss rate is a value obtained by dividing the loss count by the number of packets transmitted and multiplying the division result by 100, and denotes the proportion of losses in packet transmission.

The total delay time (milliseconds) denotes a total delay time of a packet whose delay is caused by a simple delay.

The output module 203 is an interface that outputs the monitoring result. The output module 203 is, for example, a monitor for displaying statistical information for a network administrator or a network interface that supports a communication protocol for transmission to a network management system device (NMS).

Figure 5:
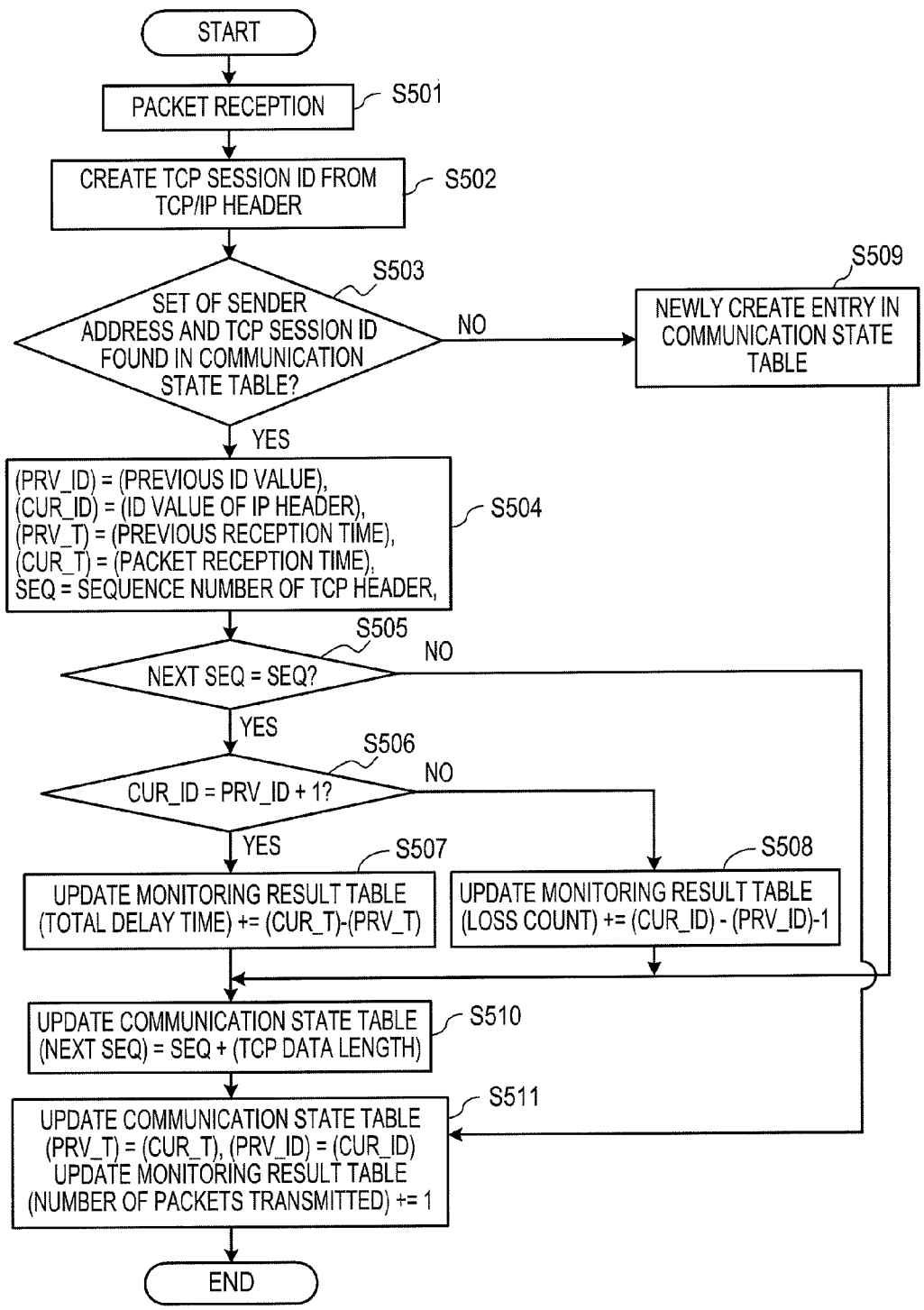
FIG. 5 is a flowchart of an identification method according to an embodiment of the present invention.

FIG. 5 is a flowchart of an identification method of the first embodiment.

In step S501, the input module 202 receives a packet and transmits the packet to the packet information acquisition module 211. Suppose the packet received this time will be referred to as a "current packet," the packet received immediately before the packet received this time will be referred to as a "previous packet," and the packet which will be received next to the packet received this time will be referred to as a "next packet."

In step S502, the packet information acquisition module 211 creates a TCP session ID from the sender address (SA) and destination address (DA) written on the IP header, and the sender port number (SP) and destination port number (DP) written on the TCP header.

Furthermore, the packet information acquisition module 211 acquires a sequence number (SEQ) of the TCP header and an identifier (ID value) of the IP header. The packet information acquisition module 211 then transmits the session ID, sequence number and identifier as one set to the packet loss/delay detection module 212.

Furthermore, the packet information acquisition module 211 transmits the time at which the packet was received (packet reception time) to the packet loss/delay detection module 212.

In step S503, the packet loss/delay detection module 212 searches the communication state table using the sender address and session ID received by the packet loss/delay detection module 212 as keys, and judges whether or not the corresponding entry is found. That is, the packet loss/delay detection module 212 judges whether or not there is an entry having the same set of sender address and session ID. When the corresponding entry is found, the process moves to step S504 and when the corresponding entry is not found, the process moves to step S509. As for the session ID, the same session ID is generated even when the sender address and the destination address are inverted. Thus, the session ID is made identifiable by also using the sender address as a search key.

In step S504, the packet loss/delay detection module 212 looks up the communication state table and acquires the previous reception time of the corresponding entry, next SEQ and previous ID value from the communication state table.

The packet loss/delay detection module 212 assumes PRV_ID as the previous ID value, CUR_ID as the identifier of the current packet, PRV_T as the previous reception time, CUR_T as the reception time of the current packet and SEQ as the sequence number of the current packet.

In step S505, the packet loss/delay detection module 212 compares the next SEQ with SEQ, moves to step S506 when the two are the same or moves to step S512 when the two are different.

In step S506, the packet loss/delay detection module 212 compares CUR_ID (identifier of the current packet) with a value resulting from adding "1" to PRV_ID (previous ID value (identifier of the previous packet)). When the two values are the same, the packet loss/delay detection module 212 judges that this is a simple delay and moves to step S507, whereas when the two values are different, the packet loss/delay detection module 212 judges that this is a delay caused by a retransmission due to a loss and moves to step S508.

In step S507, the packet loss/delay detection module 212 adds a value resulting from subtracting the previous reception time (PRV_T) from the reception time of the current packet (CUR_T) to the total delay time of the corresponding entry of the monitoring result table and writes the value into the monitoring result table.

In step S508, the packet loss/delay detection module 212 calculates the loss count this time as CUR_ID (identifier of the current packet)−PRV_ID (previous ID value (identifier of the previous packet))−1 and adds the loss count this time to the loss count of the current monitoring result table and writes the result into the monitoring result table.

In step S509, the packet loss/delay detection module 212 creates a new entry in the communication state table.

In step S510, the packet loss/delay detection module 212 calculates the SEQ (sequence number of the current packet) plus the TCP data length of the current packet (payload size) as the next SEQ (sequence number expected for the next packet to be received) and writes the next SEQ into the communication state table.

In step S511, the packet loss/delay detection module 212 writes the reception time of the current packet (CUR_T) into the communication state table as the previous reception time (PRV_T) and writes the ID value of the current packet (CUR_ID) into the communication state table as the previous ID value (PRV_ID). Furthermore, the packet loss/delay detection module 212 adds 1 to the number of packets transmitted and writes the number as a new number of packets transmitted into the monitoring result table.

Next, a specific example of judgment on a delay or loss will be illustrated.

In the following specific example, the communication state storage module 221 and the monitoring result storage module 222 store the communication state table in FIG. 3 and the monitoring result table in FIG. 4 respectively.

An example of judgment as a delay will be illustrated first.

First, the input module 202 receives a new packet (step S501).

The packet information acquisition module 211 creates a TCP session ID from the TCP header and IP header of the newly received packet (current packet) (step S502). The packet information acquisition module 211 acquires the sequence number (SEQ) of the TCP header and the identifier (ID) of the IP header. The packet information acquisition module 211 then transmits the session ID, sequence number and identifier as one set to the packet loss/delay detection module 212. Furthermore, the packet information acquisition module 211 transmits the time at which the packet was received (packet reception time) to the packet loss/delay detection module 212.

Suppose the packet received this time has acquired the sender address=α, session ID=A, sequence number (SEQ)=680 and identifier (ID value)=336.

When the packet loss/delay detection module 212 searches the communication state table using the session ID "A" and sender address "α" as keys (step S503), since the corresponding entry exists on the first row of the communication state table (FIG. 3), the packet loss/delay detection module 212 acquires "680" as the next SEQ and "335" as the previous ID value (step S504). Furthermore, the packet loss/delay detection module 212 assumes "PRV_ID" as the previous ID value, "CUR_ID" as the identifier of the current packet, "PRV_T" as the previous reception time, "CUR_T" as the reception time of the current packet and "SEQ" as the sequence number of the current packet (step S504).

When the next SEQ is compared with SEQ (step S505), both are identical 680.

Next, when CUR_ID (=336) is compared with a value resulting from adding "1" to PRV_ID (=335) (step S506), both are identical 336.

Since the next SEQ (=680) and SEQ (=680) are identical and the identifier of the current packet (=336) is consecutively incremented from the previous ID value (=335), the packet loss/delay detection module 212 judges that the current packet is simply delayed.

The packet loss/delay detection module 212 writes a value obtained by adding a value resulting from subtracting the previous reception time from the reception time of the current packet to the total delay time in the monitoring result table (step S507). The packet loss/delay detection module 212 calculates a sequence number (next SEQ) expected for the next packet to be received and writes the sequence number into the communication state table (step S510).

The packet loss/delay detection module 212 writes the reception time of the current packet (CUR_T) into the communication state table as the previous reception time (PRV_T) and writes the ID value of the current packet (CUR_ID) into the communication state table as the previous ID value (PRV_ID). Furthermore, the packet loss/delay detection module 212 writes a value resulting from adding "1" to the number of packets transmitted into the monitoring result table and the number of packets transmitted becomes 31 (step S511).

Next, an example of judgment as a loss will be illustrated.

First, the input module 202 newly receives a packet (step S501).

The packet information acquisition module 211 creates a TCP session ID from the TCP header and IP header of the newly received packet (current packet) (step S502). The packet information acquisition module 211 acquires the sequence number (SEQ) of the TCP header and the identifier (ID) of the IP header. The packet information acquisition module 211 then transmits the session ID, sequence number, and identifier as one set to the packet loss/delay detection module 212. Furthermore, the packet information acquisition module 211 transmits the time at which the packet was received (packet reception time) to the packet loss/delay detection module 212.

Suppose the packet received this time has acquired sender address=α, session ID=A, sequence number (SEQ)=680 and identifier (ID value)=337.

When the packet loss/delay detection module 212 searches the communication state table using session ID "A" and sender address "α" as keys (step S503), since the corresponding entry exists on the first row of the communication state table (FIG. 3), the packet loss/delay detection module 212 acquires "680" as the next SEQ and "335" as the previous ID value (step S504). Furthermore, the packet loss/delay detection module 212 assumes "PRV_ID" as the previous ID value, "CUR_ID" as the identifier of the current packet, "PRV_T" as the previous reception time, "CUR_T" as the reception time of the current packet and "SEQ" as the sequence number of the current packet (step S504).

When the next SEQ is compared with SEQ (step S505), both are identical 680.

Next, when CUR_ID (=337) is compared with PRV_ID (=335) plus 1 (step S506), the two are different.

While the next SEQ (=680) is identical to the SEQ (=680), the identifier of the current packet (=337) is not consecutively incremented from the previous ID value (=335), and therefore the packet loss/delay detection module 212 judges that the current packet is a retransmitted packet, that is, that the delay is attributable to a retransmission due to a loss (step S506).

The loss count is calculated as the ID value of the current packet−previous ID value−1=337−335−1=1. The packet loss/delay detection module 212 writes a value obtained by adding the loss count 1 calculated this time to the current loss count 0 in the monitoring result table, that is 1 (step S508).

The packet loss/delay detection module 212 calculates a sequence number (next SEQ) expected for the next packet to be received and writes the sequence number into the communication state table (step S510).

The packet loss/delay detection module 212 writes the reception time of the current packet (CUR_T) into the communication state table as the previous reception time (PRV_T), and writes the ID value of the current packet (CUR_ID) into the communication state table as the previous ID value (PRV_ID). Furthermore, the packet loss/delay detection module 212 writes a value obtained by adding "1" to the number of packets transmitted into the monitoring result table and the number of packets transmitted becomes 31 (step S511).

(Second Embodiment)

In a second embodiment, a case where one transmitting host transmits packets to a plurality of receiving hosts will be explained.

Figure 6:
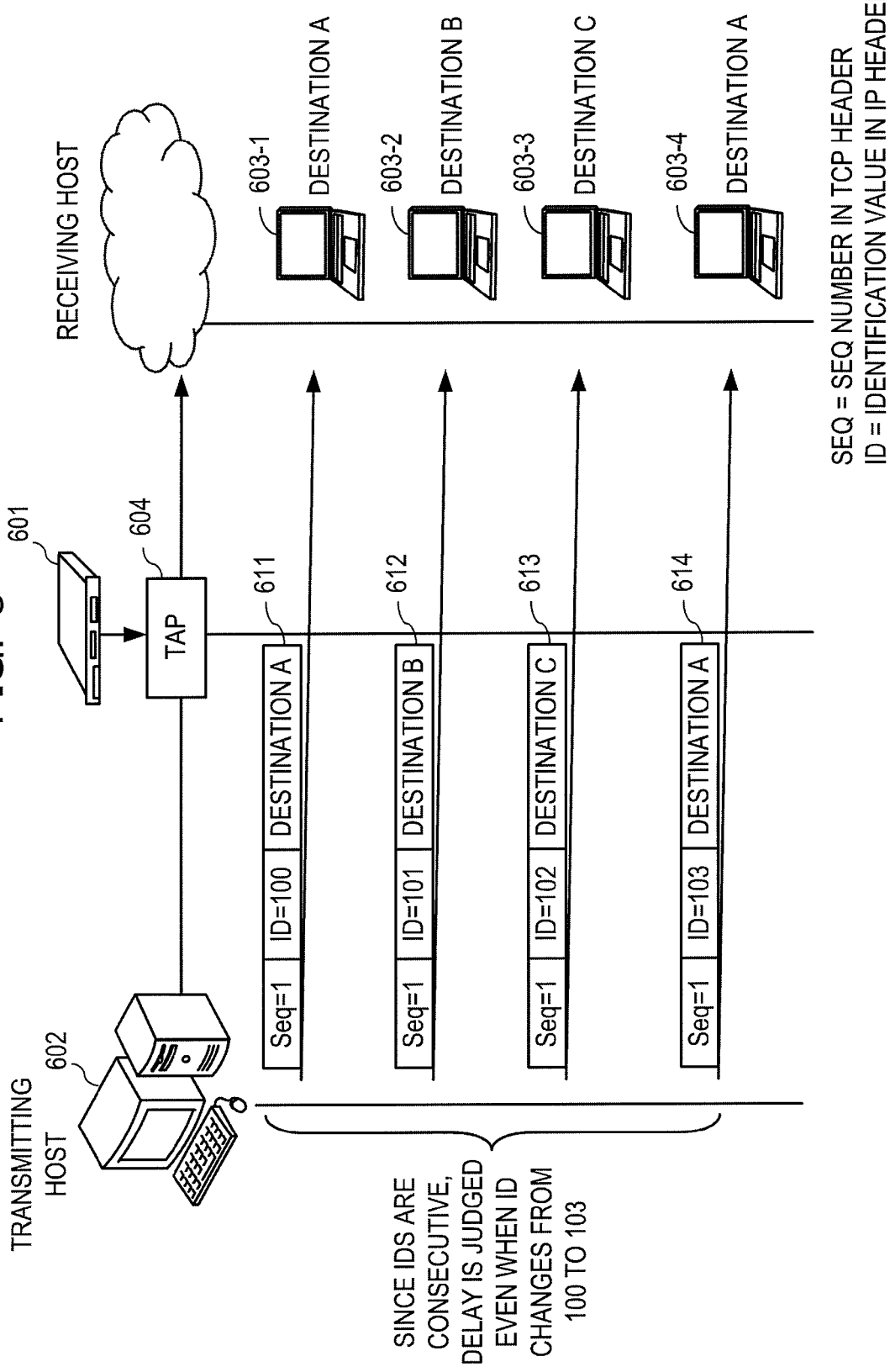
FIG. 6 is a block diagram of a system according to a second embodiment.

FIG. 6 is a block diagram and a conceptual diagram of a system according to the second embodiment.

The system according to the second embodiment is provided with a packet capturing device 601, a transmitting host 602, receiving hosts 603-n (n=1 to 4) and a tap 604.

The tap 604 is interposed between the transmitting host 602 and the receiving hosts 603-n.

The packet capturing device 601 is connected to the tap 604, and the transmitting host 602 and receiving hosts 603-n are connected to the tap 604 via a network respectively.

When the transmitting host 602 transmits a packet to any of the receiving hosts 603-n, the tap 604 interposed between the transmitting host 602 and the receiving hosts 603-n branches the packet to the packet capturing device 601. The packet capturing device 601 then receives the packet.

Suppose the IP addresses of the receiving hosts 603-1, 603-2 and 603-3 are A, B and C.

In FIG. 6, packet 611, packet 612, packet 613 and packet 614 are transmitted in that order from the transmitting host 602. The packet 611, packet 612, packet 613 and packet 614 are transmitted to the receiving host 603-1, receiving host 603-2, receiving host 603-3 and receiving host 603-4, respectively.

Furthermore, "Seq" denotes a sequence number of a packet and "ID" denotes an identifier.

The packet is transmitted to the receiving host 603-1 without any loss, but since packets are transmitted to other receiving hosts between the transmissions of the packet 611 and packet 614, the identifier (100) of the packet 611 is not followed by the identifier (103) of the packet 614. In this case, if the identification method of the first embodiment is used, it may be judged that there is a loss although there is actually no loss. According to the second embodiment, it is judged, even in such a case, that the packet 614 is simply delayed.

Even when the transmitting host transmits packets to a plurality of receiving hosts and identifiers are not consecutive numbers for the same TCP session, the second embodiment allows a correct judgment to be made.

Figure 7:
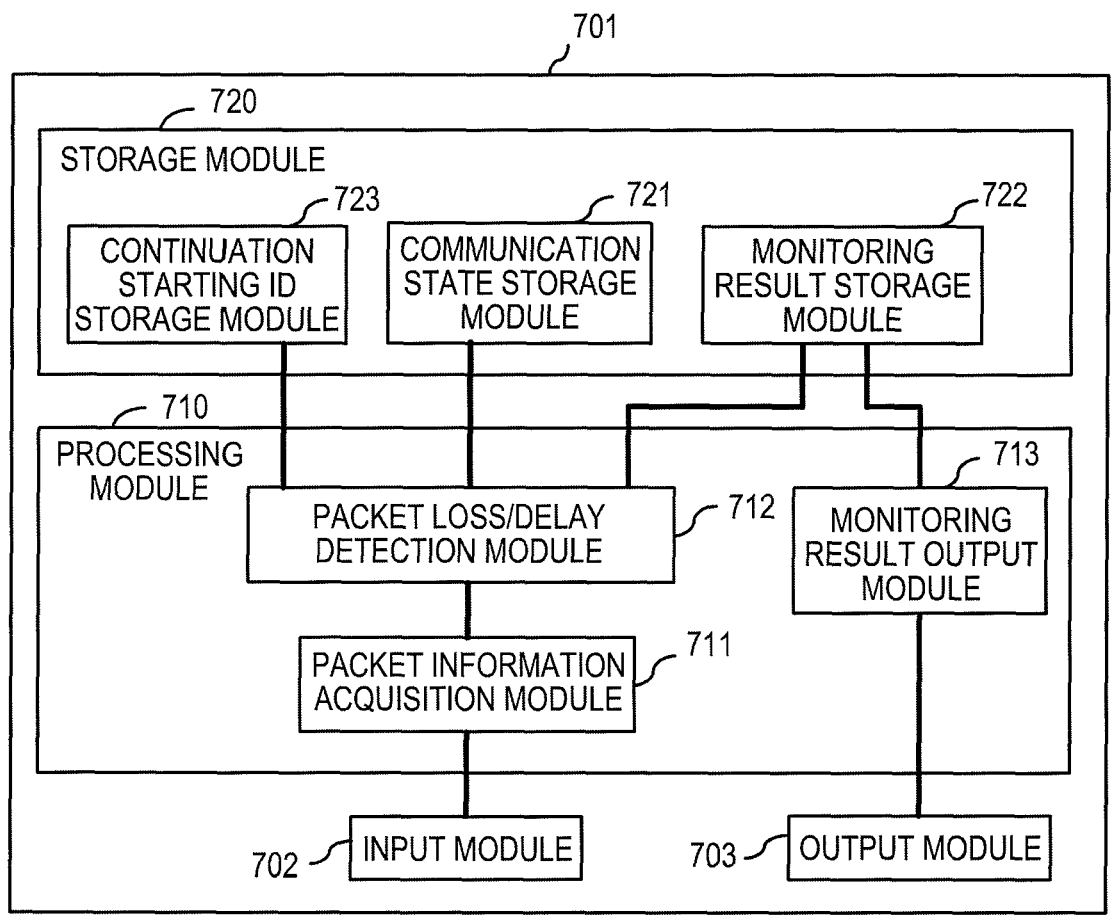
FIG. 7 is a block diagram of a packet capturing device according to the second embodiment of the present invention.

FIG. 7 is a block diagram of a packet capturing device according to the second embodiment.

The packet capturing device 701 is provided with an input module 702, a processing module 710, a storage module 720 and an output module 703.

The input module 702 is an interface to which a packet is inputted. The input module 702 transmits the received packet or information to the processing module 710.

The processing module 710 is provided with a packet information acquisition module 711, a packet loss/delay detection module 712 and a monitoring result output module 713.

The packet information acquisition module 711 creates a TCP session ID from the information of the IP header and TCP header. Furthermore, the packet information acquisition module 711 transmits the TCP session ID created, the information written on the IP header and TCP header, such as sequence number and identifier, and reception time of the packet, or the like, to the packet loss/delay detection module 712.

The packet loss/delay detection module 712 judges whether a packet is delayed or lost based on the information stored in the communication state storage module 721 and the information from the packet information acquisition module 711. Furthermore, the packet loss/delay detection module 712 writes various types of information, such as a total delay time and loss count of the packet, reception time and identifier of the packet, into the communication state storage module 721, monitoring result storage module 722 and continuation starting ID storage module 723.

The monitoring result output module 713 acquires part or whole of the information of the monitoring result table stored in the monitoring result storage module 722, and transmits the information to the output module 703. For example, the monitoring result output module 713 may extract stored statistical information based on the value of a specific session ID or a filtering condition of masking with high-order 24 bits of the session ID or the like, and transmit the statistical information to the output module 703.

The storage module 720 is provided with a communication state storage module 721, a monitoring result storage module 722 and a continuation starting ID storage module 723.

The communication state storage module 721 stores a communication state table as illustrated in FIG. 3.

The communication state table is similar to that of the first embodiment.

The monitoring result storage module 722 stores a monitoring result table as illustrated in FIG. 8.

The monitoring result table includes items like a sender address, a TCP session ID, the number of packets transmitted, the number of times judgment proved impossible and a total delay time.

The sender address, TCP session ID, number of packets transmitted and total delay time are similar to those of the first embodiment.

The number of times judgment proved impossible denotes the number of times judgment on a delay or loss has been proved impossible.

The continuation starting ID storage module 723 is provided with a continuation starting ID table as illustrated in FIG. 9. The continuation starting ID table includes items like a sender address, a continuation starting ID value, an immediately preceding ID value and an increment.

The sender address is the IP address of a transmitting host.

The continuation starting ID value is an identifier (ID value) of the IP header of a first packet when a packet is transmitted without any loss.

The immediately preceding ID value is an identifier (ID value) of the IP header of a packet previously transmitted by the sender host.

The increment is a range within which packets can be regarded as followed by each other without any loss.

For example, when the entry on the first row is referred to, the sender address is α, the continuation starting ID value is 1 and the immediately preceding ID value is 335. This illustrates that a transmitting host whose sender address is α is consecutively transmitting packets without any loss from the packet whose identifier (ID value) is 1 to the immediately preceding packet whose identifier (ID value) is 335.

Figure 10:
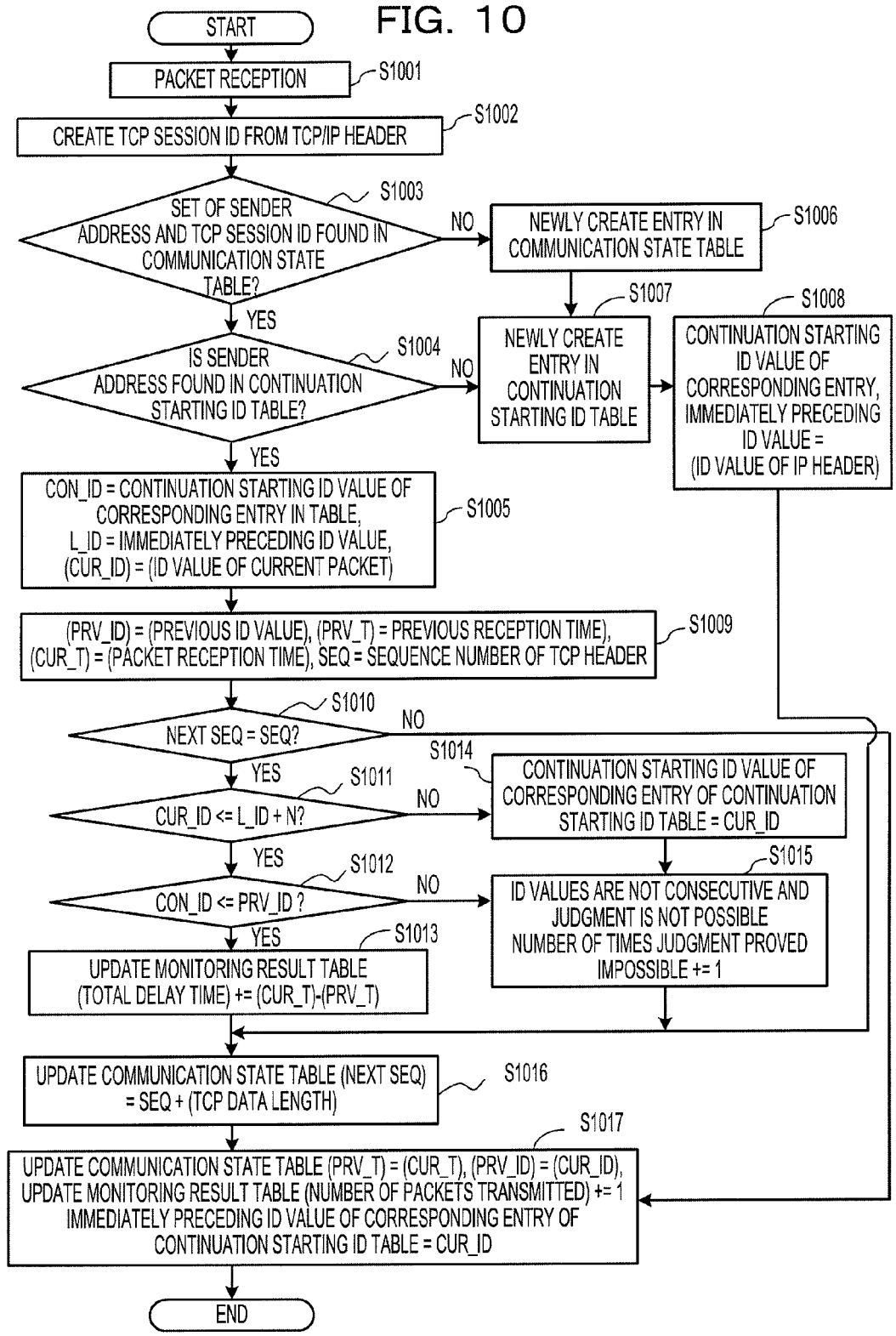
FIG. 10 is a flowchart of an identification method according to the second embodiment of the present invention.

FIG. 10 is a flowchart of the identification method according to the second embodiment.

In step S1001, the input module 702 receives a packet and transmits the packet to the packet information acquisition module 711.

In step S1002, the packet information acquisition module 711 creates a TCP session ID from the sender address (SA), sender port number (SP), destination address (DA) and destination port number (DP) written on the TCP header or IP header.

Furthermore, the packet information acquisition module 711 acquires a sequence number (SEQ) of the TCP header and an identifier (ID) of the IP header. The packet information acquisition module 711 then transmits the session ID, sequence number and identifier as one set to the packet loss/delay detection module 712.

In step S1003, the packet loss/delay detection module 712 looks up the communication state table and judges whether or not the same set of session ID and sender address as the set of session ID and sender address received by the packet loss/delay detection module 712 is found in the communication state table.

When the same set of session ID and sender address is found, the process moves to step S1004 and when the same set of session ID and sender address is not found, the process moves to step S1006.

In step S1004, the packet loss/delay detection module 712 checks whether or not the sender address is found in the continuation starting ID table, and the process moves to step S1005 when the sender address is found or moves to step S1007 when the sender address is not found.

In step S1005, the packet loss/delay detection module 712 assumes "CON_ID" as the continuation starting ID value of the corresponding entry of the continuation starting ID table, "L_ID" as the immediately preceding ID value of the corresponding entry of the continuation starting ID table and "CUR_ID" as the ID value of the IP header of the current packet.

In step S1006, the packet loss/delay detection module 712 creates a new entry in the packet communication state table.

In step S1007, the packet loss/delay detection module 712 creates a new entry in the continuation starting ID table.

In step S1008, the packet loss/delay detection module 712 writes the continuation starting ID value of the corresponding entry of the continuation starting ID table and the immediately preceding ID value to be the ID value of the IP header of the current packet into the continuation starting ID table.

In step S1009, the packet loss/delay detection module 712 looks up the communication state table and acquires the previous reception time of the session ID, next SEQ, and previous ID value from the communication state table.

The packet loss/delay detection module 712 assumes "PRV_ID" as the previous ID value, "PRV_T" as the previous reception time, "CUR_T" as the reception time of the current packet and "SEQ" as the sequence number of the current packet.

In step S1010, the packet loss/delay detection module 712 compares the next SEQ with SEQ, moves to step S1011 when the two are the same or moves to step S1017 when the two are different because it is not possible to distinguish between a delay and loss and performs table update processing.

In step S1011, the packet loss/delay detection module 712 compares the ID value (CUR_ID) of the current packet with the immediately preceding ID value (L_ID) plus a constant N. When CUR_ID is L_ID+N or less, the process moves to step S1012 or when CUR_ID is greater than L_ID+N, the process moves to step S1014. In step S1011, when CUR_ID has increased from L_ID only by N or less, the ID values are regarded as consecutive numbers.

In step S1012, the packet loss/delay detection module 712 compares the continuation starting ID value (CON_ID) of the corresponding entry with the ID value (PRV_ID) of the previous packet. When CON_ID is equal to or less than PRV_ID, the packet is judged to be delayed and the process moves to step S1013, whereas when CON_ID is greater than PRV_ID, the process moves to step S1015.

In step S1013, the packet loss/delay detection module 712 adds a value resulting from subtracting the previous reception time from the reception time of the current packet to the total delay time in the monitoring result table.

In step S1014, the packet loss/delay detection module 712 writes the ID value (CUR_ID) of the current packet into the continuation starting ID value of the corresponding entry of the continuation starting ID table. In step S1014, since CUR_ID is greater than L_ID+N, the packet loss/delay detection module 712 regards the preceding ID values as not consecutive numbers and updates the continuation starting ID value with the ID value of the current packet.

In step S1015, since the ID values are not consecutive numbers, the packet loss/delay detection module 712 judges that it is not possible to judge whether the packet is delayed or lost, and adds "1" to the number of times judgment proved impossible in the monitoring result table.

In step S1016, the packet loss/delay detection module 712 calculates the sequence number of the current packet plus the data length (payload size) of the current packet as a sequence number (next SEQ) expected for the next packet and writes the next SEQ into the communication state table.

In step S1017, the packet loss/delay detection module 712 writes the reception time of the current packet into the previous reception time of the communication state table and the ID value of the current packet into the previous ID value respectively. Furthermore, the packet loss/delay detection module 712 adds "1" to the number of packets transmitted in the monitoring result table. Furthermore, the packet loss/delay detection module 712 writes the ID value of the current packet into the immediately preceding ID value of the corresponding entry in the continuation starting ID table.

Next, a specific example of the second embodiment will be described.

In the following specific example, suppose the communication state table in FIG. 3, the monitoring result table in FIG. 8 and the continuation starting ID table in FIG. 9 are stored in the communication state storage module 721, monitoring result storage module 722 and continuation starting ID storage module 723 respectively.

First, the input module 702 newly receives a packet (step S1001).

The packet information acquisition module 711 creates a TCP session ID from the TCP header and IP header of the newly received packet (current packet) (step S1002). The packet information acquisition module 711 acquires a sequence number (SEQ) of the TCP header and an identifier (ID value) of the IP header. The packet information acquisition module 711 transmits the session ID, sequence number and identifier as one set to the packet loss/delay detection module 712. Furthermore, the packet information acquisition module 711 transmits the time at which the packet was received (packet reception time) to the packet loss/delay detection module 712.

Suppose sender address=α, session ID=B, sequence number (SEQ)=421 and identifier (ID value)=336 have been acquired with the packet received this time.

When the packet loss/delay detection module 712 searches the communication state table using the session ID "B" and sender address "α" as keys (step S1003), the corresponding entry exists on the second row of the communication state table (FIG. 3).

When the packet loss/delay detection module 712 searches the continuation starting ID table using the sender address "α" as a key (step S1004), the corresponding entry exists on the first row of the continuation starting ID table (FIG. 9).

The packet loss/delay detection module 712 assumes "CON_ID" as the continuation starting ID value (1) of the corresponding entry in the continuation starting ID table, "L_ID" as the immediately preceding ID value (335) of the corresponding entry in the continuation starting ID table, "CUR_ID" as the identifier (ID value) (336) of the IP header of the current packet (step S1005). Furthermore, the packet loss/delay detection module 712 acquires "1" as the increment N from the continuation starting ID table.

The packet loss/delay detection module 712 acquires "421" as the next SEQ and "211" as the previous ID value (step S1009). Furthermore, the packet loss/delay detection module 712 assumes "PRV_ID" as the previous ID value (211), "PRV_T" as the previous reception time, "CUR_T" as the reception time of the current packet and "SEQ" as the sequence number (421) of the current packet (step S1009).

When the next SEQ is compared with SEQ (step S1010), the two are identical 421.

When CUR_ID (336) is compared with L_ID (335) plus increment N (1) (step S1011), CUR_ID is L_ID+N or less.

When CON_ID (1) is compared with PRV_ID (211) (step S1012), CON_ID is PRV_ID or less.

As described above, the packet loss/delay detection module 712 regards the ID value of the current packet to be consecutive and judges that there is no retransmission due to a loss and the packet is simply delayed.

Hereafter, the packet loss/delay detection module 712 updates the monitoring result table, communication state table, and continuation starting ID table (steps S1013, S1016, S1017).

The packet capturing device of the second embodiment can identify the delay even when the sender host is communicating with a plurality of destination hosts.

(Third Embodiment)

In a third embodiment, a case where the OS (Operation System) of a sender host is a specific OS such as Linux (registered trademark) will be explained.

Figure 11:
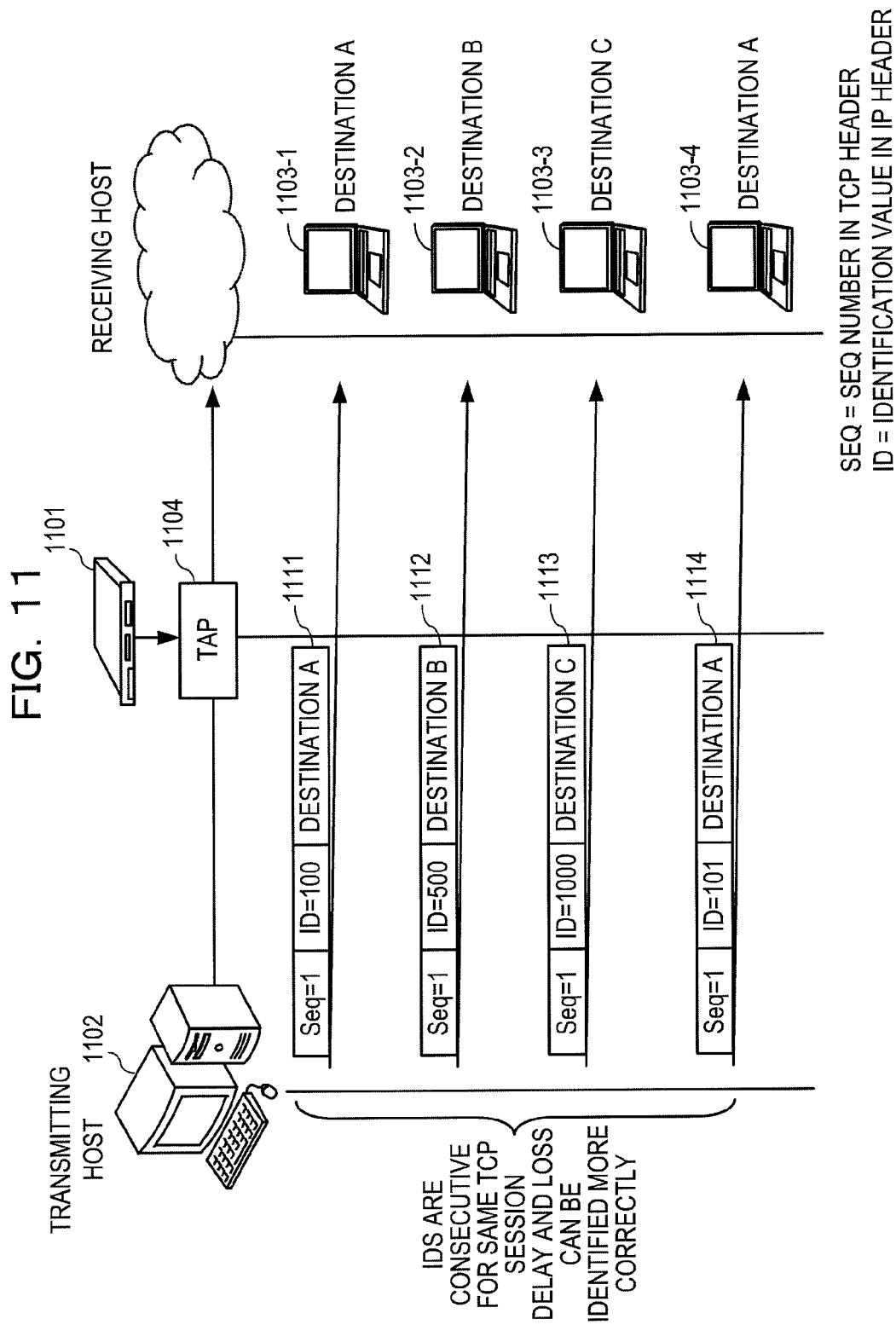
FIG. 11 is a block diagram of a system according to a third embodiment.

FIG. 11 is a system block diagram and conceptual diagram of the third embodiment.

The system of the third embodiment is provided with a packet capturing device 1101, a transmitting host 1102, receiving hosts 1103-n (n=1 to 4) and a tap 1104.

The tap 1104 is interposed between the transmitting host 1102 and the receiving hosts 1103-n.

The packet capturing device 1101 is connected to the tap 1104, and the transmitting host 1102 and receiving hosts 1103-n are connected to the tap 1104 via a network respectively.

When the transmitting host 1102 transmits a packet to any of the receiving hosts 1103-n, the tap 1104 interposed between the transmitting host 1102 and the receiving hosts 1103-n branches the packet to the packet capturing device 1101. The packet capturing device 1101 then receives the packet.

Suppose the IP addresses of the receiving hosts 1103-1, 1103-2 and 1103-3 are A, B and C respectively.

In FIG. 11, packets are transmitted from the transmitting host 1102 in order of packet 1111, packet 1112, packet 1113 and packet 1114. The packet 1111, packet 1112, packet 1113, and packet 1114 are transmitted to the receiving host 1103-1, receiving host 1103-2, receiving host 1103-3 and receiving host 1103-4 respectively.

Furthermore, "Seq" denotes a sequence number of a packet and "ID" denotes an identifier.

When the transmitting host 1102 uses a specific OS (Operation System) such as Linux (registered trademark), the identifier (ID value) of the IP header starts from a random value for each TCP connection and is incremented by 1 every time one packet is transmitted, but the identifier is not a value common to the transmitting hosts.

The identifier of the packet 1111 transmitted to the receiving host 1103-1 is 100, the identifier of the packet 1112 transmitted to the receiving host 1103-2 is 500 and the identifier of the packet 1113 transmitted to the receiving host 1103-3 is 1000.

Thus, identifiers which differ from one TCP session to another are given as initial values. The identifier of the packet 1114 transmitted to the receiving host 1103-4 is 101 and identifiers are followed by the packet 1111 for the same TCP session.

Using this nature makes it possible to conclude that for packets that belong to the same TCP session, identifiers are necessarily incremented by 1 at a time, and therefore this nature is used to identify a loss or a delay.

If identifiers are necessarily incremented by 1 at a time for packets that belong to the same TCP session, the identification method of the first embodiment (flowchart in FIG. 5) can be used.

In other cases, the identification method of the second embodiment (flowchart in FIG. 9) is used.

The packet capturing device 1101 of the third embodiment has both functions of the packet capturing device 201 of the first embodiment and a second packet capturing device 701 and uses those functions properly as required.

Which identification method should be used is judged according to the type of the OS of each transmitting host.

Figure 12:
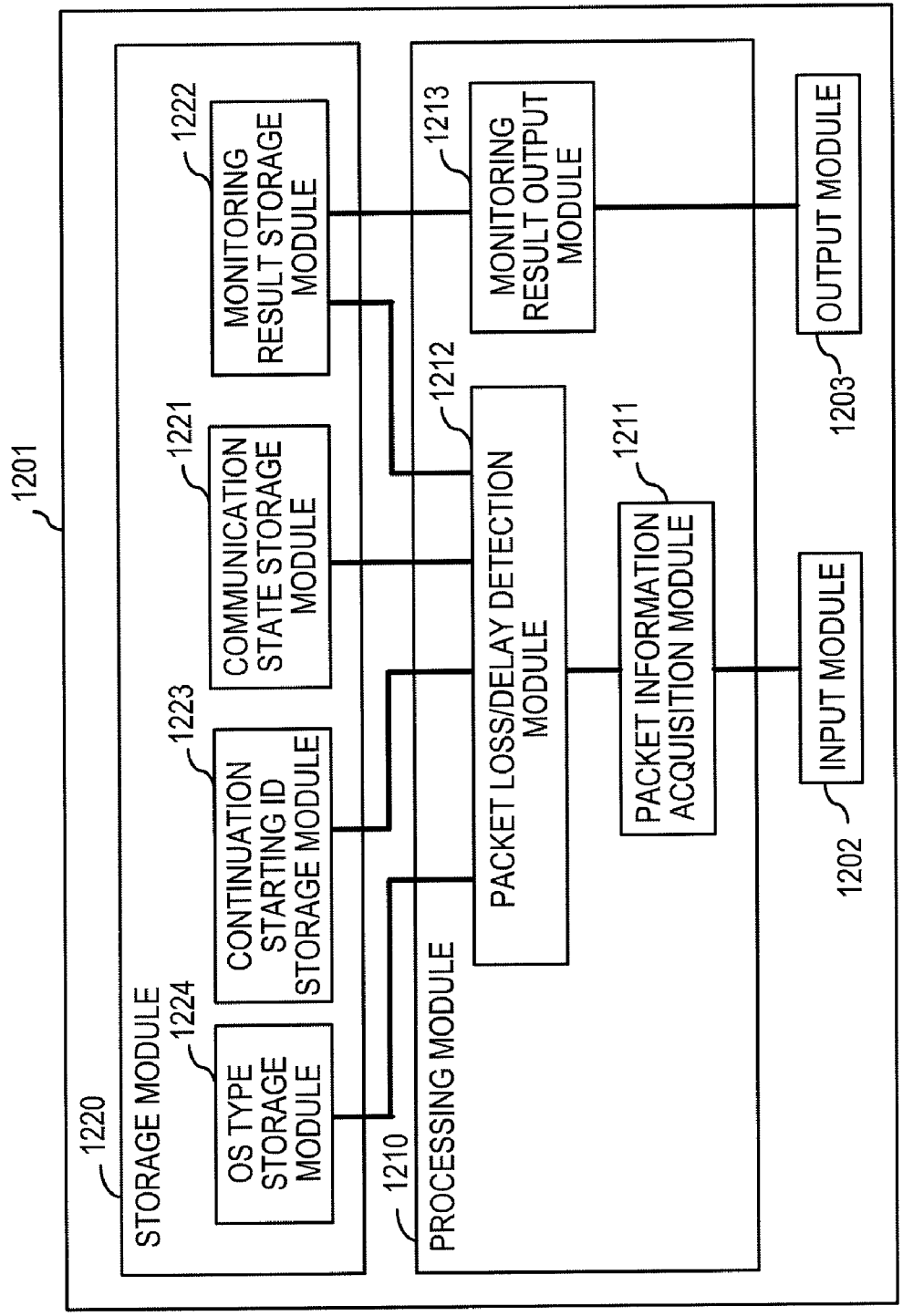
FIG. 12 is a block diagram of a packet capturing device according to the third embodiment of the present invention.

FIG. 12 is a block diagram of the packet capturing device of the third embodiment.

The packet capturing device 1201 is provided with an input module 1202, an output module 1203, a processing module 1210 and a storage module 1220.

The input module 1202 is an interface to which a packet is inputted. The input module 1202 transmits the received packet or information to the processing module 1210.

The processing module 1210 performs processing such as acquisition of information on the header of the packet, identification of the cause of a delay based on the acquired information and transmission of the result.

The output module 1203 is an interface that outputs a monitoring result and may be a screen for displaying statistical information to a network administrator or may be a network interface that supports a communication protocol for transmission to the network management system device (NMS).

The processing module 1210 is provided with a packet information acquisition module 1211, a packet loss/delay detection module 1212 and a monitoring result output module 1213.

The packet information acquisition module 1211 creates a TCP session ID from the information on the IP header and TCP header. Furthermore, the packet information acquisition module 1211 transmits the created TCP session ID, information written on the IP header and TCP header, such as the sequence number and identifier, and reception time of the packet, or the like, to the packet loss/delay detection module 1212.

The packet loss/delay detection module 1212 identifies the OS type or judges whether the packet is delayed or lost based on the information stored in a communication state storage module 1221 and information from the packet information acquisition module 1211. Furthermore, the packet loss/delay detection module 1212 writes various types of information such as a total delay time of the packet, loss count, reception time of the packet and identifier into the communication state storage module 1221, a monitoring result storage module 1222, a continuation starting ID storage module 1223 and an OS type storage module 1224.

The monitoring result output module 1213 acquires part or whole of the information of the monitoring result table stored in the monitoring result storage module 1222 and transmits the information to the output module 1203. For example, the monitoring result output module 1213 may extract stored statistical information based on the value of a specific session ID or a filtering condition of masking with high-order 24 bits of the session ID or the like and transmit the statistical information to the output module 1203.

The storage module 1220 is provided with the communication state storage module 1221, monitoring result storage module 1222, continuation starting ID storage module 1223 and OS type storage module 1224.

The communication state storage module 1221 is provided with a communication state table as illustrated in FIG. 3. The communication state table is similar to that of the second embodiment.

The monitoring result storage module 1222 is provided with a monitoring result table as illustrated in FIG. 13. The monitoring result table includes items like a sender address, a TCP session ID, the number of packets transmitted, a loss count, a loss rate, a total delay time and the number of times judgment proved impossible.

The sender address, TCP session ID, number of packets transmitted, loss count, loss rate and total delay time are similar to those of the first embodiment. Furthermore, the number of times judgment proved impossible is similar to that of the second embodiment.

The continuation starting ID storage module 1223 is provided with a continuation starting ID table as illustrated in FIG. 9. The continuation starting ID table is similar to that of the second embodiment.

Figure 14:
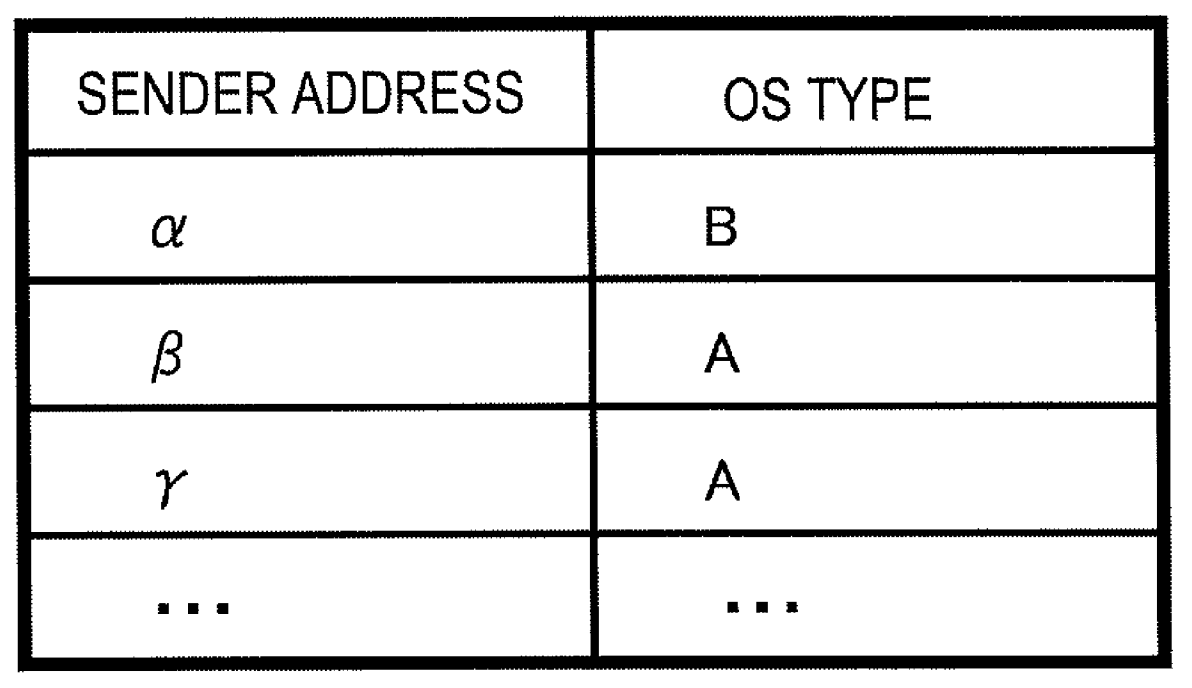

The OS type storage module 1224 is provided with an OS type table as illustrated in FIG. 14.

The OS type table includes items like a sender address and an OS type. IP addresses of transmitting hosts are stored as the sender address. OS types of transmitting hosts are stored as the OS type.

The OS type table stores sender addresses and OS types in association with each other.

An OS type B is an OS which gives identifiers differing from one TCP session to another and gives identifiers in increments of 1 to packets that belong to the same TCP session, and, for example, Linux is such an OS. An OS type A is an OS that gives identifiers not differing from one TCP session to another.

FIG. 15 is a flowchart of the identification method of the third embodiment.

In step S1501, the input module 1202 receives a packet.

In step S1502, the packet information acquisition module 1211 judges whether or not the received packet is a SYN/ACK packet. The process moves to step S1503 when the packet is a SYN/ACK packet or moves to step S1504 when the packet is not a SYN/ACK packet.

The SYN/ACK packet is a packet used when a TCP connection is established.

In the procedure for establishing a TCP connection, a client transmits a connection request (SYN packet) to a server first. The server transmits a response (SYN/ACK packet) to the connection request to the client. The client transmits an ACK packet to the server in response to the SYN/ACK packet. The TCP connection is established through such a procedure.

Whether or not the packet is a SYN/ACK packet is judged by checking whether the SYN flag or ACK flag of the TCP header is 1. When the SYN flag or ACK flag is 1, the packet is judged to be a SYN/ACK packet.

In step S1503, the packet information acquisition module 1211 judges whether or not the identifier (ID value) of the IP header of the packet is 0 and the process moves to step S1507 when the identifier is 0 or moves to step S1509 when the identifier is not 0. According to the OS which gives identifiers differing from one TCP session to another and gives identifiers in increments of 1 to packets that belong to the same TCP session, the identifier of the SYN/ACK packet is 0. Therefore, in step S1503, the OS type is identified by the identifier of the SYN/ACK packet.

In step S1504, the packet loss/delay detection module 1212 searches the OS type table using the sender address of the IP header of the packet as a key.

In step S1505, when the search result in step S1504 proves that there is no corresponding entry in the OS type table, the process moves to step S1506 or moves to step S1510 when there is the corresponding entry.

In step S1506, the packet loss/delay detection module 1212 creates a new entry in the OS type table.

In step S1507, the packet loss/delay detection module 1212 writes "B" as the OS type into the OS type table.

In step S1508, the process moves to step S502 in FIG. 5. The packet capturing device 1201 performs the processes from step S502 onward, and when END in FIG. 5 is reached, the process returns to step S1508 and ends. In this case, the input module 1202, output module 1203, packet information acquisition module 1211, packet loss/delay detection module 1212, monitoring result output module 1213, communication state storage module 1221 and monitoring result storage module 1222 correspond to the input module 202, output module 203, packet information acquisition module 211, packet loss/delay detection module 212, monitoring result output module 213, communication state storage module 221 and monitoring result storage module 222 of the first embodiment respectively.

In step S1509, the packet loss/delay detection module 1212 writes "A" as the OS type into the OS type table.

In step S1510, the packet loss/delay detection module 1212 looks up the OS type table, judges the OS type of the sender host of the packet and the process moves to step S1511 when the type is A or moves to step S1508 when the type is not A (the type is B).

In step S1511, the process moves to step S1002 in FIG. 10. The packet capturing device 1201 performs the processes from step S1002 onward and when END in FIG. 5 is reached, the process returns to step S 1511 and ends. In this case, the input module 1202, output module 1203, packet information acquisition module 1211, packet loss/delay detection module 1212, monitoring result output module 1213, communication state storage module 1221, monitoring result storage module 1222 and continuation starting ID storage module 1223 correspond to the input module 702, output module 703, packet information acquisition module 711, packet loss/delay detection module 712, monitoring result output module 713, communication state storage module 721, monitoring result storage module 722 and continuation starting ID storage module 723 of the second embodiment respectively.

The packet capturing device of the third embodiment identifies the OS type, and can thereby use an identification method that matches the OS of a transmitting host. This increases the possibility that packets can be correctly identified.

According to the technique disclosed so far, it is possible to distinguish whether a packet delay is simply caused by a delay or caused by a retransmission.

The present invention has been explained according to the embodiments so far, but the present invention is not limited to the above embodiments and it goes without saying that various modifications and improvements can be made without departing from the scope of the present invention.

What is claimed is:

1. A packet capturing device comprising:
    an acquisition unit that acquires an identifier (ID) value and a sequence number written on a header of a received packet;
    a storage unit that stores a previous ID value which is an ID value of a previously-received packet and a next sequence number which is a sequence number that a next packet to be received should have; and
    a detection unit that judges whether a delay of the received packet is caused by a simple delay or a retransmission accompanying a loss,
    wherein the detection unit
    compares the next sequence number with a sequence number of the received packet,
    compares the previous ID value with an ID value of the received packet, and
    judges that the delay is a simple delay when the next sequence number matches the sequence number of the received packet and the previous ID value is followed by the ID value of the received packet and judges that the delay is caused by a retransmission when the previous ID value is not followed by the ID value of the received packet.

2. The packet capturing device according to claim 1, wherein the ID value is an identifier of an Internet Protocol (IP) header of a packet and the sequence number is a sequence number of a Transmission Control Protocol (TCP) header.

3. A packet capturing device comprising:
    an acquisition unit that acquires an identifier (ID) value and a sequence number written on a header of a received packet;
    a storage unit that stores a previous ID value which is an ID value of a previously-received packet and a next sequence number which is a sequence number that a next packet to be received should have; and
    a detection unit that judges whether a delay of the received packet is caused by a simple delay or a retransmission accompanying a loss,
    wherein the detection unit
    compares the next sequence number with a sequence number of the received packet,
    compares the previous ID value with an ID value of the received packet, and
    judges that the delay is a simple delay when the next sequence number matches the sequence number of the received packet and the previous ID value is followed by the ID value of the received packet and judges that the delay is caused by a retransmission when the previous ID value is not followed by the ID value of the received packet,
    wherein the storage unit stores an immediately preceding ID value which is an ID value of a packet previously transmitted by a sender host, and
    wherein the detection unit
    compares the next sequence number with the sequence number of the received packet,
    compares the ID value of the received packet with a value resulting from adding a predetermined number to the immediately preceding ID value, and
    judges that the delay is a simple delay when the next sequence number matches the sequence number of the received packet and the ID value of the received packet is equal to or less than the value resulting from adding the predetermined number to the immediately preceding ID value, or judges that judgment is not possible when the ID value of the received packet received this time is greater than the value resulting from adding the predetermined number to the immediately preceding ID value.

4. The packet capturing device according to claim 3, wherein the detection unit
    judges an Operation System (OS) type of a transmitting host,
    when the OS of the transmitting host is an OS that gives ID values differing from one Transmission Control Protocol (TCP) session to another to packets and gives the ID values in increments of 1 to packets that belong to a same TCP session,
    compares the next sequence number with the sequence number of the received packet,
    compares the previous ID with the ID value of the received packet,
    judges that the delay is a simple delay when the next sequence number matches the sequence number of the received packet and the previous ID is followed by the ID value of the received packet, and judges that the delay is caused by a retransmission when the previous ID is not followed by the ID value of the received packet,
    when the OS of the transmitting host is an OS that does not give ID values differing from one TCP session to another to packets,
    compares the next sequence number with the sequence number of the received packet,
    compares the ID value of the received packet with the value resulting from adding the predetermined number to the immediately preceding ID value, and
    judges that the delay is a simple delay when the next sequence number matches the sequence number of the received packet and the ID value of the received packet is equal to or less than the value resulting from adding the predetermined number to the immediately preceding ID value, or judges that judgment is not possible when the ID value of the received packet is greater than the value resulting from adding the predetermined number to the immediately preceding ID value.

* * * * *